United States Patent Office 3,451,312
Patented June 24, 1969

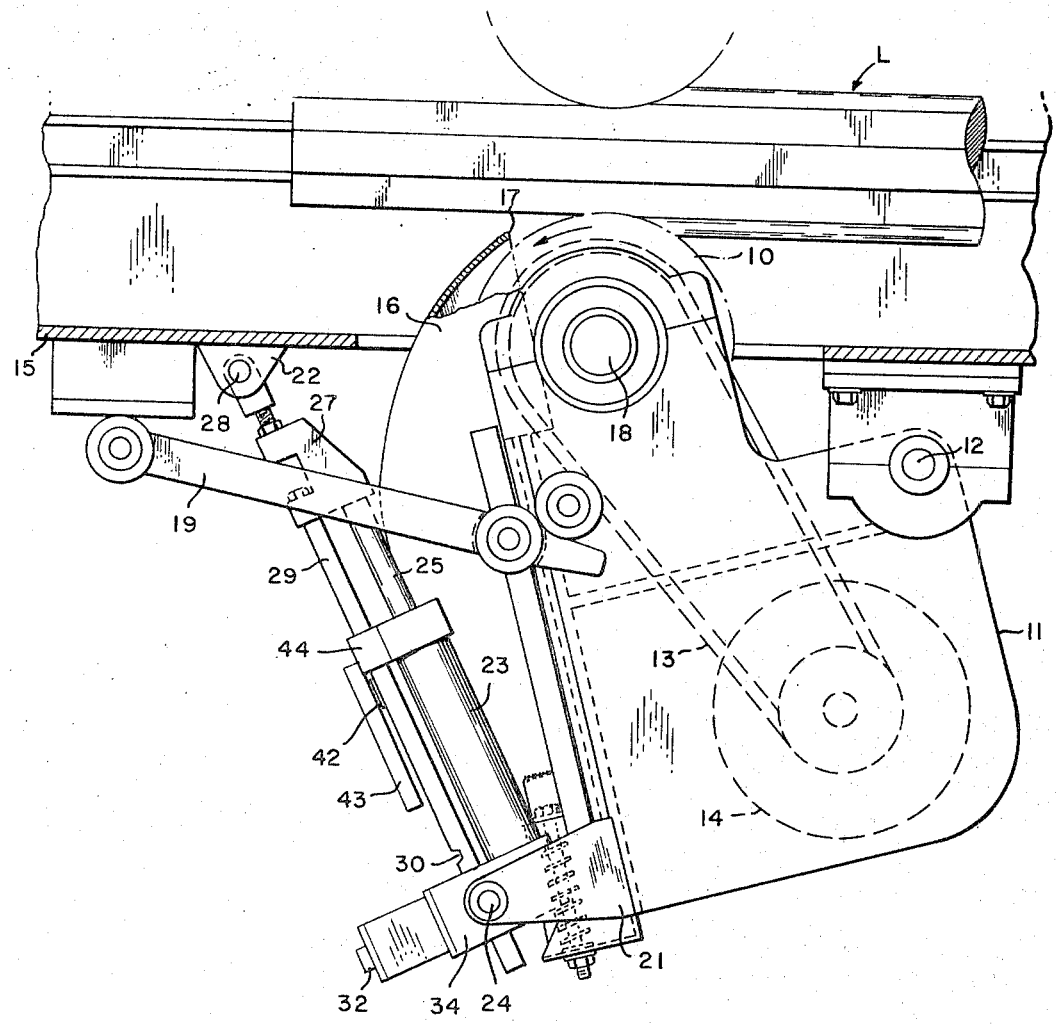
FIG—1

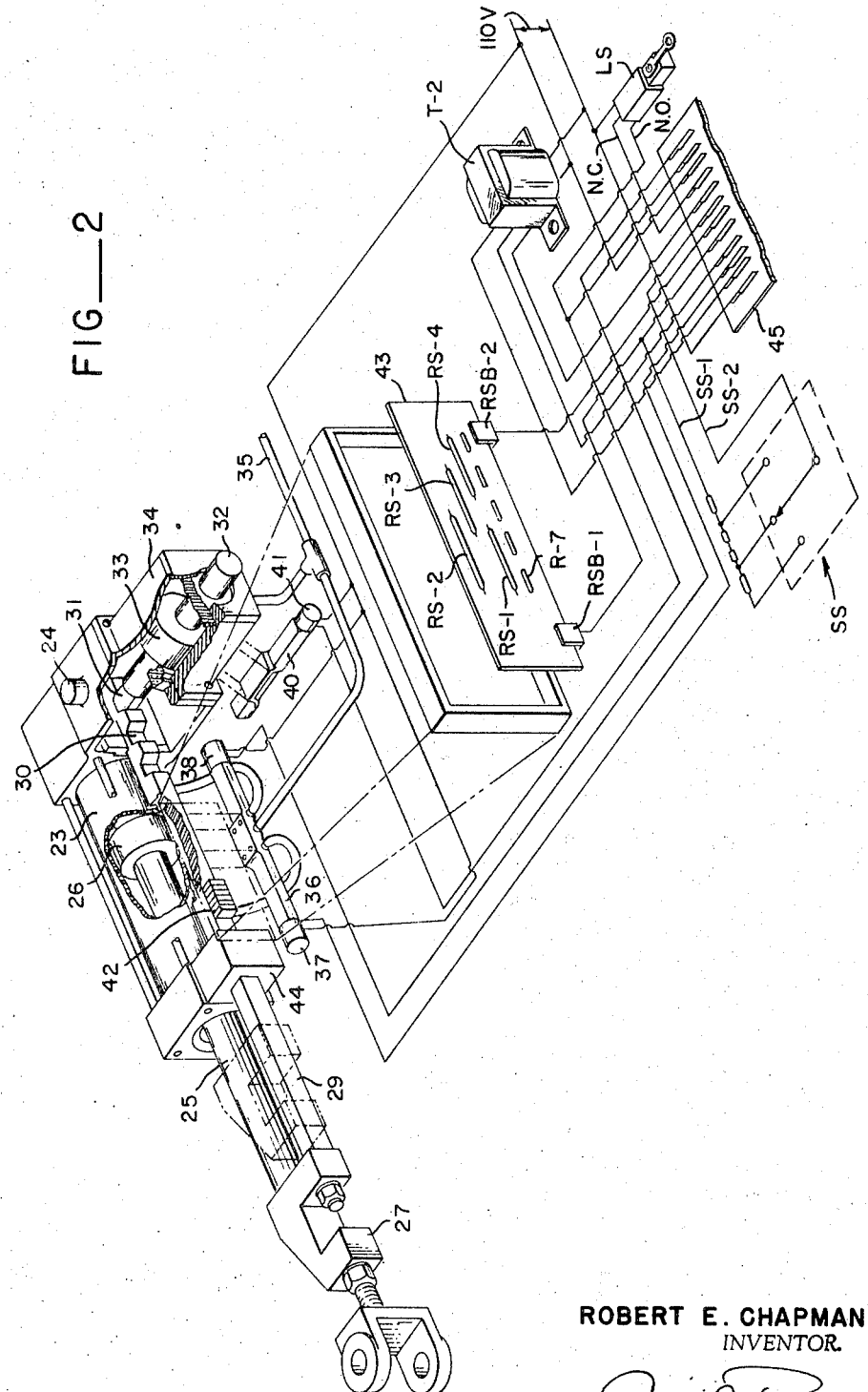
FIG—2
ROBERT E. CHAPMAN
INVENTOR.
BY
ATTORNEYS

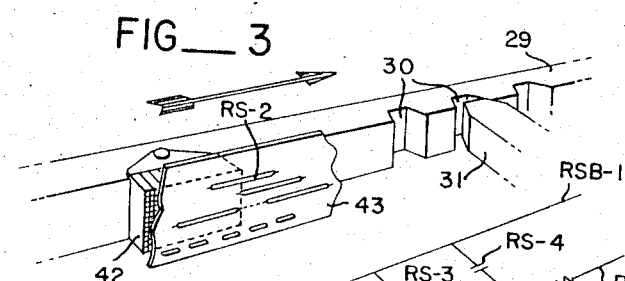
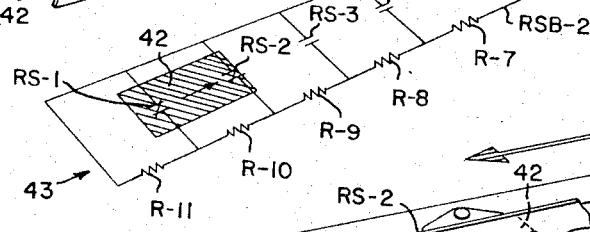
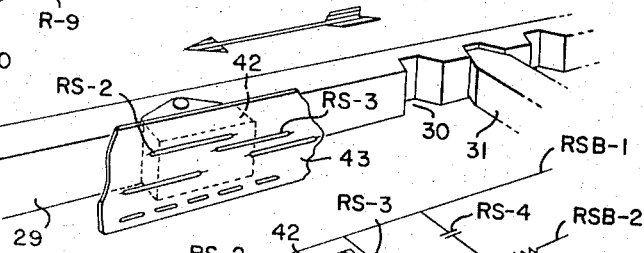
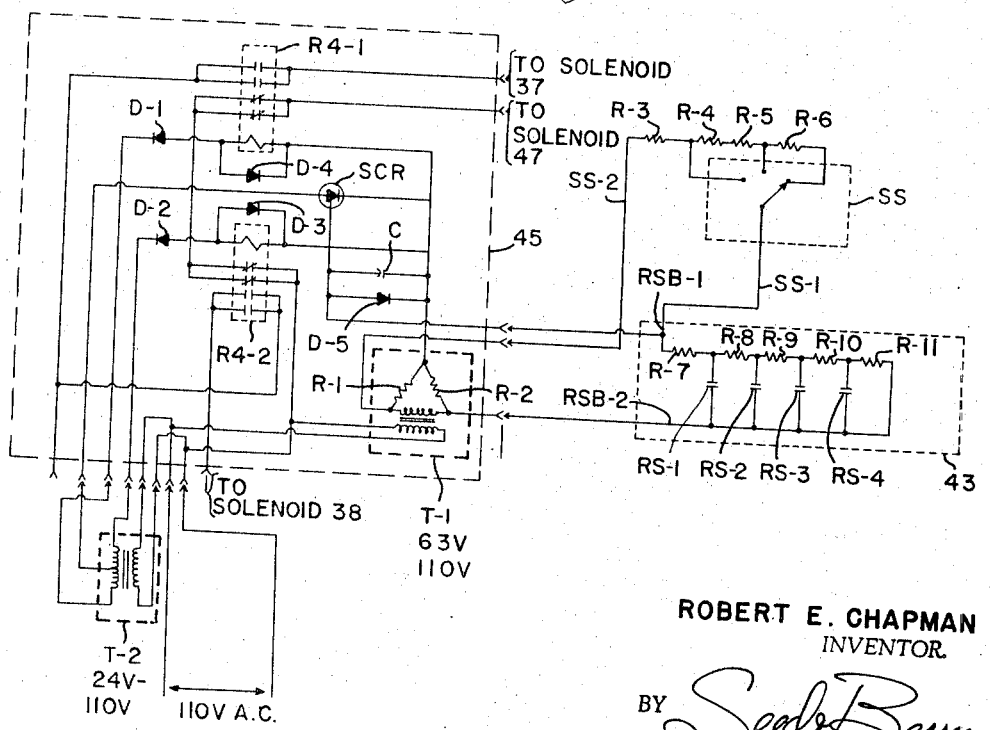

3,451,312
POSITIONING CONTROL FOR MOVABLE CUTTER HEAD
Robert E. Chapman, Vancouver, British Columbia, Canada, assignor to Ernest E. Runnion, Shelton, Wash.
Filed Apr. 28, 1966, Ser. No. 545,957
Int. Cl. F15b *13/044, 13/01, 15/26*
U.S. Cl. 91—42                                                    1 Claim

ABSTRACT OF THE DISCLOSURE

The invention relates to a control system for shifting a movable cutter head to and locking the same in a selected one of a plurality of positions, and the object is to devise a system in which the shifting operation is accomplished with unusual rapidity under force of a pressure fluid and the locking action is made positive, both operations being performed automatically in response to the activation of a selector switch under control of an operator and contained in an electric circuit employing the Wheastone bridge principle.

BACKGROUND OF INVENTION

The system of the present invention is particularly adapted for use in controlling the movable cutter heads in a profie mil such as that illustrated in application for Letters Patent of the United States of Ernest E. Runnion, Ser. No. 453,547. In said mill a succession of small-diameter logs are conveyed along a travel path through at least one processing station occupied by a cutter head which is mounted for movement toward and from the travel path into a selected one of several settings each of which places the head so that the same profiles a log of a given diameter in a manner calculated to later obtain from the log, by sawing, a maximum amount of dimensional lumber. The diameter of the log is determined in course of its conveyed travel to said station, and the "reading" of this determined diameter acts through an electric circuit to first shift the cutter head to the particular setting which is related to the reading, and then hold the cutter head in the position to which it was shifted. Three solenoids are included in the electric circuit.

In the prior mill here being discussed, the shift motion of the cutter head is governed by a "Hanna-Power" positioner and is obtained by pressure air operating upon a double-acting piston. A 3-position valve governs the delivery of air pressure from a pressure source, and two of the solenoids are associated with the valve to operate the latter in opposite directions from a centered neutral position.

The function of holding the cutter head in the particular setting to which it is shifted is performed by an hydraulic cylinder mounted alongside the air cylinder and having its double-acting piston connected to the cutter head. The holding function results from the establishment of an hydraulic lock, the arrangement being one providing a normally open fluid-flow connection between the two ends of the cylinder, and closing said fluid-flow connection upon the excitation of the other of said three solenoids. The excitation of such latter solenoids is made to occur when the air cylinder has shifted the cutter head to the position dictated by the "Hanna-Powr" positioner. The system of the present invention, for shifting the cutter employs a double-acting pneumatic jack much the same as said prior system, but provides a positive mechanical lock in lieu of the hydraulic lock for holding the cutter head in its various settings. There are several objections to a hydraulic lock. (1) The flow of the hydraulic fluid from one to the other end of the hydraulic cylinder as the cutter head is being shifted from one to another setting exerts a drag upon the head so that its speed of travel is slowed by comparison with the speed at which the compressed air would otherwise move the head. (2) The positioning of the head lacks absolute precision. (3) Leakage of hydraulic fluid, which can occur from various causes, permits the head to creep.

DESCRIPTION OF DRAWINGS

In the accompanying drawings:

FIG. 1 is a fragmentary top plan view of a log-profiling mill including a cutter head or heads mounted for movement toward and from a path travelled by a log which is being conveyed through the mill, and in association with the head showing the mechanical portion of a shift-and-lock structure embodying preferred teachings of the present invention.

FIG. 2 is an isometric partially exploded view of said mechanical portion together with a diagram of a part of an electric circuit which controls the operation.

FIGS. 3 and 5 are fragmentary isometric views portraying two of the components, one movable and the other stationary, of the present shift-and-lock structure and showing such movable component as moving in one direction in one view and in the other direction in the other view.

FIGS. 4 and 6 are schematic views relating the former to the FIG. 3 illustration and the latter to the FIG. 5 illustration; and FIG. 7 is a wiring diagram of the invention's electric circuitry.

DESCRIPTION OF INVENTION

For purposes of illustration the cutter head to which the present invention is applied is denoted by the numeral 10 and is shown as being carried by a swing-frame 11. The swing-frame swings about the center of trunnion pins 12 as an axis, moving inwardly and outwardly relative to a patch travelled by a succession of conveyed logs L into a selected one of a plurality of positions each correlated to a respective one of several different log diameters. A belt 13 passes drive from an electric motor 14 to the arbor 18 of the cutter head. A main frame for the mill is indicated fragmentarily at 15. The swing-frame is illustrated as being equipped with a slidably-mounted duct 16 through which chips thrown peripherally from the cutter head are funneled into a lower-level receiving bin (not shown). The slide motion of the duct is no part of the present invention but its purpose is to maintain, regardless of the position into which the swing-frame is swung, an approximately uniform spacing between the lip 17 of the duct and the cutting plane of the cutting head. A level 19 governs the slide motion.

Swing motion of the swing-frame is afforded by a pneumatic double-acting positioner jack linking a bracket 21 on the swing-frame to a lug 22 on the main frame 11. The cylinder 23 for the jack connects by trunnion pins 24 with the bracket, and the rod 25 of the piston 26 has its exposed end fixed to a block 27 which is yoked to the lug by means of a pivot pin 28. Also fixed to the block is a dogging bar 29 which lies parallel with the piston rod to one side of the cylinder 23 and slides in guides which are carried by the cylinder at each of the two ends of the latter.

The dogging bar has a plurality of spaced apart notches 30, three being illustrated for purposes of example, and adapted to lodge in a selected one of these notches is a mating dog 31. The dog is formed upon the inner end of a rod 32 slidable endwise to its axis along a path normal to the slide axis of the dogging bar. The rod is fixed to a double-acting piston 33 working in an air cylinder 34 fixedly associated with the cylinder 23. Pressure air for the operation of the two pistons, namely the positioner piston 26 and the dogging piston 33, is fed through a pipe 35 from a common source of supply and is directed to either end of the related cylinders by means of shuttle-type valves under the control of solenoids. The valve for the positioner piston works in a valve body 36, moving in opposite directions from a normal centered neutral position upon the excitation of a respective one of two solenoids 37 and 38. The valve for the dogging piston works in a valve body 40, shuttling by the excitation of a single solenoid 41 from a normal piston-retracting position to a piston-advancing position. Side edges of the dog are bevelled so as to permit a nosing entry of the dog into the notches momentarily in advance of the point at which the dogging bar, given movement by the positioner piston as a desired setting is selected on a selector switch SS, reaches a position of exact mating registration relative to the dog.

The dogging bar has a permanent magnet 42 fixed thereto, and associated therewith, so as to be traversed by the magnet as the dogging bar moves, is a reed switch board 43. The reed switch board is attached to an ear 44 which forms one of the two guides for the dogging bar.

Now considering the electric circuitry, which includes a packaged circuit board 45, selector switch SS has three positions. Its movement from one to another position shunts out its resistors R–4, R–5 and R–6 so that the resistance changes between lines SS–1 and SS–2. The reed switch board 43 carries four reed switches RS–1, RS–2, RS–3, and RS–4 together with resistors R–7 through R–11. The circuit board 45 uses the wheatstone bridge principle to compare the resistance between the two lines RSB–1 and RSB–2 to the resistance between said lines SS–1 and SS–2. When the same are equal (balanced) the solenoid 41 is energized and air on the piston 33 forces the dog 31 into a registering one of three notches in the dogging bar. Neither of the solenoids 37 or 38 are energized when this balanced condition obtains.

Should the selector switch SS now be moved to a new position a condition of imbalance develops as between the comparative resistance of SS–1 to SS–2 and RSB–1 to RSB–2. This imbalance performs two functions. (1) It deenergizes solenoid 41 so that piston 33 withdraws the dog. (2) It energizes either the solenoid 37 or the solenoid 38. Should the imbalance be such that the resistance between SS–1 and SS–2 is higher than that between RSB–1 and RSB–2 it is the former solenoid which is excited. This permits pressure air to act upon the positioner piston 26 and responsively move the cutter head inwardly until the resistance—reflecting the action of magnet 42 on the reed switches of the reed switch board 43—between RSB–1 and RSB–2 is again equal to the resistance between SS–1 and SS–2. Should such imbalance be lower in respect of the SS–1 and SS–2 relation than the RSB–1 and RSB–2 relation, the solenoid 38 is excited, with a responsive outward movement of the cutter head for the distance necessary to balance the resistances. In either such case, when a balanced resistance condition is reached the solenoid 37 or 38, as the case may be, is deenergized and solenoid 41 again becomes excited to cause the dog 31 to be propelled inwardly into the registering notch.

Using the illustrations of FIGS. 3 through 6 as examples, let it be assumed (FIGS. 3 and 4) that the cutter head is to be moved inwardly and the selector switch has been set on #2 position for this purpose. The system, with the dogging bar moving in the direction of the arrows, will be balanced as soon as RS–2 closes. The magnet is positioned so that it will allow RS–2 to close just as the dogging bar notch starts to line up with the dog. Let it be asumed (FIGS. 5 and 6) that the cutter head is to be moved outwardly and the selector switch, for this purpose, has been swung from its #1 to its #2 position. With the dogging bar now moving in the opposite direction, shown by the arrows, the system balances as soon as RS–3 opens. Again, it is to be noted that the switch RS–3 is so located that it opens just as the concerned dogging bar notch starts to line up with the dog.

A limit switch LS may be incorporated into the system to provide a pre-select feature. With the limit switch in the normal position a normally closed (N.C.) connection feed current to the solenoids 37 and 38 through the circuit board 45. With the limit switch in the tripped position, said solenoids are cut off from the current source and solenoid 41 is energized through N.O. contacts on the limit-switch. With the limit-switch in this latter position, a setting can be selected on the switch and the positioner valve will not move until the limit switch has returned to its normal position.

It is thought that the invention will have been clearly understood from the foregoing description of my now-preferred illustrated embodiment. It is my intention that no limitations be implied and that the scope of the invention be given the broadest interpretation to which the employed language admits.

I claim:

1. In a system for controlling the shift movement of a shiftable member, in combination; a member mounted for shifting movement along an established travel path including guide means having a plurality of notches therein, a positive acting locking member movable into and out of locking engagement with the notches of said shiftable member guide means for releasably holding the same against shifting movement, means for powering the shiftable member in said shifting movements, means for powering the locking member in the latter's said movements, electrically operated control means for the means which powers the shiftable member normally de-energized and characterized in that, when energized, the powering means is caused to shift the shiftable member, electrically operated control means for the means which powers the locking member, two variable-resistance current-conducting instruments characterized in that the variations in resistance of one of said instruments is under manual control and that the other reflects changing positions of the shiftable member, first switching means manually operated for varying the resistance of said first-characterized instrument, second switching means including normally open reed switches opened and closed by the attraction of a traversing magnet carried by the shiftable member for varying the resistance of said second-characterized instrument, and electrical circuitry including a Wheatstone bridge with said first and second-characterized instruments coupled to said bridge establishing balanced and unbalanced conditions of the bridge, said electrical circuitry coupled to said electrically operated control means for said locking member and for said shiftable member causing the shiftable member to be shifted when the resistance condition of one current conducting instrument is in a state of inbalance relative to the resistance condition of the other current conducting instrument and causing the locking member to be moved into locking engagement with the shiftable member when the relative resistance conditions are in a state of balance.

References Cited

UNITED STATES PATENTS

| | | | |
|---|---|---|---|
| 1,700,532 | 1/1929 | Hunter | 92—18 |
| 3,095,785 | 7/1963 | Cahill | 91—42 |
| 3,176,590 | 4/1965 | Uhtenwoldt et al. | 91—45 |
| 3,251,278 | 5/1966 | Royster | 92—24 |
| 3,361,034 | 1/1968 | Rothrock | 91—42 |

MARTIN P. SCHWADRON, *Primary Examiner.*

I. C. COHEN, *Assistant Examiner.*

U.S. Cl. X.R.

91—45; 92—18, 24